US009716746B2

(12) United States Patent
Garg et al.

(10) Patent No.: US 9,716,746 B2
(45) Date of Patent: Jul. 25, 2017

(54) SYSTEM AND METHOD USING SOFTWARE DEFINED CONTINUITY (SDC) AND APPLICATION DEFINED CONTINUITY (ADC) FOR ACHIEVING BUSINESS CONTINUITY AND APPLICATION CONTINUITY ON MASSIVELY SCALABLE ENTITIES LIKE ENTIRE DATACENTERS, ENTIRE CLOUDS ETC. IN A COMPUTING SYSTEM ENVIRONMENT

(71) Applicant: Sanovi Technologies Pvt. Ltd., Bangalore, Karnataka (IN)

(72) Inventors: Devendra Garg, Bangalore (IN); Vinodraj Kuppuswamy, Bangalore (IN); Adarsh Holavanhalli, Bangalore (IN)

(73) Assignee: Sanovi Technologies Pvt. Ltd., Bangalore (IN)

(*) Notice: Subject to any disclaimer, the term of this patent is extended or adjusted under 35 U.S.C. 154(b) by 172 days.

(21) Appl. No.: 14/444,557

(22) Filed: Jul. 28, 2014

(65) Prior Publication Data

US 2015/0032817 A1 Jan. 29, 2015

(30) Foreign Application Priority Data

Jul. 29, 2013 (IN) .......................... 3359/CHE/2013

(51) Int. Cl.
*H04L 29/08* (2006.01)
*G06F 9/50* (2006.01)

(52) U.S. Cl.
CPC ............ *H04L 67/10* (2013.01); *G06F 9/5072* (2013.01)

(58) Field of Classification Search
CPC ..... H04L 67/10; G06F 9/5072; G06F 9/5055; G06F 9/5077; G06F 9/5044
USPC ........................................................ 709/204
See application file for complete search history.

(56) References Cited

U.S. PATENT DOCUMENTS

| | | | |
|---|---|---|---|
| 7,934,116 B2 | 4/2011 | Mehrdad | |
| 8,402,229 B1 | 3/2013 | Wilt et al. | |
| 8,412,678 B2 | 4/2013 | Wall et al. | |
| 8,417,938 B1 * | 4/2013 | Considine | H04L 41/12 713/151 |
| 8,451,983 B2 | 5/2013 | Hulls | |
| 8,639,793 B2 | 1/2014 | Kapur et al. | |

(Continued)

FOREIGN PATENT DOCUMENTS

| | | | |
|---|---|---|---|
| CN | 101808012 A | * | 8/2010 |
| CN | 101969475 A | * | 2/2011 |
| CN | 101808012 B | * | 7/2012 |

*Primary Examiner* — Kostas Katsikis
(74) *Attorney, Agent, or Firm* — Pearne & Gordon LLP; Robert F. Bodi (57) ABSTRACT

A system and method for achieving Business Continuity and Application Continuity with the system comprising one or more resources of multiple end users or service providers logically connected to one or more cloud infrastructures wherein the collection of resources forms a Continuity Grid or a part of Continuity Grid or sub Grid for which continuity is needed and wherein the Continuity Grid or part of continuity grid or sub Grid are paired with the Continuity Peer Grids located in the same or different cloud infrastructures to satisfy continuity requirements of the Continuity Grid or part of Continuity Grid or sub Grid.

21 Claims, 4 Drawing Sheets

(56) References Cited

U.S. PATENT DOCUMENTS

| | | | |
|---|---|---|---|
| 8,655,939 B2 * | 2/2014 | Redlich | F41H 13/00 707/602 |
| 8,793,688 B1 * | 7/2014 | Mustacchi | G06F 9/45558 718/1 |
| 8,943,284 B2 * | 1/2015 | Hoffman | G06F 9/45558 711/162 |
| 9,319,265 B2 * | 4/2016 | Bloomstein | H04L 29/08801 |
| 9,331,480 B2 * | 5/2016 | Taft | H02J 3/00 |
| 9,374,270 B2 * | 6/2016 | Nakil | H04L 41/0668 |
| 9,465,708 B2 * | 10/2016 | Garg | G06F 11/26 |
| 9,489,268 B2 * | 11/2016 | Babashetty | G06F 11/1458 |
| 2005/0027785 A1 * | 2/2005 | Bozak | G06F 9/5072 709/200 |
| 2005/0050184 A1 * | 3/2005 | Boden | G06Q 10/06 709/223 |
| 2006/0212332 A1 * | 9/2006 | Jackson | G06F 9/5027 709/226 |
| 2006/0230149 A1 * | 10/2006 | Jackson | G06F 9/5027 709/226 |
| 2007/0174290 A1 * | 7/2007 | Narang | G06F 17/30539 |
| 2008/0281915 A1 * | 11/2008 | Elad | G06Q 10/10 709/204 |
| 2009/0077099 A1 * | 3/2009 | Haustein | G06F 9/5011 |
| 2009/0210427 A1 | 8/2009 | Eidler et al. | |
| 2009/0276771 A1 * | 11/2009 | Nickolov | G06F 9/4856 717/177 |
| 2010/0332401 A1 * | 12/2010 | Prahlad | G06F 17/3002 705/80 |
| 2010/0332629 A1 * | 12/2010 | Cotugno | G06F 9/5072 709/221 |
| 2011/0131275 A1 * | 6/2011 | Maida-Smith | H04L 63/20 709/204 |
| 2011/0270968 A1 * | 11/2011 | Salsburg | G06F 9/5072 709/224 |
| 2011/0314069 A1 * | 12/2011 | Alatorre | G06F 17/30082 707/827 |
| 2012/0096134 A1 * | 4/2012 | Suit | G06F 9/5072 709/221 |
| 2012/0110186 A1 * | 5/2012 | Kapur | G06F 9/5072 709/226 |
| 2012/0137001 A1 * | 5/2012 | Ferris | H04W 4/003 709/226 |
| 2012/0137003 A1 * | 5/2012 | Ferris | H04W 4/003 709/226 |
| 2012/0166646 A1 * | 6/2012 | Boldyrev | G06F 9/5088 709/226 |
| 2012/0179824 A1 * | 7/2012 | Jackson | G06F 9/5027 709/226 |
| 2012/0297238 A1 | 11/2012 | Watson et al. | |
| 2012/0310423 A1 * | 12/2012 | Taft | G06Q 50/06 700/286 |
| 2012/0310558 A1 * | 12/2012 | Taft | H02J 3/00 702/61 |
| 2012/0310559 A1 * | 12/2012 | Taft | H02J 13/0013 702/62 |
| 2012/0314608 A1 * | 12/2012 | Okuno | H04L 67/2828 370/252 |
| 2012/0331147 A1 * | 12/2012 | Dutta | G06F 9/06 709/226 |
| 2013/0080823 A1 | 3/2013 | Roth et al. | |
| 2013/0124400 A1 * | 5/2013 | Hawkett | G06F 9/5072 705/39 |
| 2013/0179874 A1 * | 7/2013 | Aliminati | H04L 41/0893 717/176 |
| 2013/0211546 A1 * | 8/2013 | Lawson | G05B 19/4185 700/9 |
| 2013/0212422 A1 | 8/2013 | Bauer et al. | |
| 2013/0218841 A1 | 8/2013 | Hall et al. | |
| 2013/0239004 A1 * | 9/2013 | Bihani | H04L 67/10 715/734 |
| 2013/0262678 A1 * | 10/2013 | Tung | G06F 9/5072 709/226 |
| 2013/0339643 A1 * | 12/2013 | Tekade | G06F 17/30581 711/162 |
| 2013/0346573 A1 | 12/2013 | Hemachandran et al. | |
| 2014/0006858 A1 | 1/2014 | Helfman et al. | |
| 2014/0244896 A1 * | 8/2014 | Goss | G06F 3/067 711/103 |
| 2014/0244937 A1 * | 8/2014 | Bloomstein | H04L 29/08801 711/136 |
| 2014/0277788 A1 * | 9/2014 | Forbes, Jr. | G05F 1/66 700/286 |
| 2014/0336795 A1 * | 11/2014 | Asenjo | G05B 19/4083 700/86 |
| 2014/0337086 A1 * | 11/2014 | Asenjo | G06Q 10/0635 705/7.28 |
| 2014/0337429 A1 * | 11/2014 | Asenjo | H04L 65/403 709/204 |
| 2015/0052144 A1 * | 2/2015 | Mari | G06F 17/30598 707/740 |
| 2015/0066231 A1 * | 3/2015 | Clifton | H02J 7/0068 700/296 |

\* cited by examiner

SYSTEM AND METHOD USING SOFTWARE DEFINED CONTINUITY (SDC) AND APPLICATION DEFINED CONTINUITY (ADC) FOR ACHIEVING BUSINESS CONTINUITY AND APPLICATION CONTINUITY ON MASSIVELY SCALABLE ENTITIES LIKE ENTIRE DATACENTERS, ENTIRE CLOUDS ETC. IN A COMPUTING SYSTEM ENVIRONMENT

CROSS REFERENCE TO THE RELATED APPLICATION

This application claims priority from Indian Patent Application No. 3359/CHE/2013 filed on Jul. 29, 2013, the entire disclosure of which is incorporated herein by reference.

FIELD OF THE INVENTION

The present invention generally relates to computer systems. In particular, the present invention relates to system and methods using Software Defined Continuity (SDC) for achieving business continuity across entities such as entire data centers, entire clouds etc. and Application Defined Continuity (ADC) for the applications to define and request continuity requirements. More particularly, the present invention relates to system and methods using Software Defined Continuity (SDC) and Application Defined Continuity (ADC) which implies universal, fluid, intelligent, responsive, massively scalable Continuity Grids to maintain continuity on any type of resource(s) that needs continuity irrespective of its size/capability and across all types of data centers, service providers, dissimilar clouds, applications, networks etc. as requested by applications.

BACKGROUND OF THE INVENTION

Continuity, traditionally, encompasses best practices and processes that can be applied only to the resources they are designed to protect. For example when two database servers are run across geographies and a database log shipping strategy is used to keep them continuous. Another example is when hypervisor based replication is used to keep two geographically separated virtual machines continuous.

The above mentioned examples imply 1:1 relationships between the two sides of a continuity strategy (endpoints) and constrain the service provider because intimate knowledge of resource/process requirements of the strategy is required to make it work.

To this end, cloud infrastructures are used in Information Technology Enterprises to achieve continuity in various forms such as data replication, availability zones, orchestration, virtual machine motion, distributed state queues etc. However, continuity achieved by the available cloud infrastructures is limited in that high levels of continuity are not available across entities such as entire data centers, entire clouds, applications/services that span datacenters/clouds, virtual companies, virtual offices, network segments, etc. that scale massively with respect to resources like servers, networks, storage, etc. that are contained within them. There are several disadvantages associated with the available clouds infrastructure, thereby limiting its continuity, such as:

Each resource of the cloud infrastructure such as, being not limited to Servers (virtual machines, bare metal, software designed, etc.). Storage (disks, storage arrays, file systems etc.), Services (Infrastructure-IaaS, Compute-CaaS, Software-SaaS, Platform-PaaS, IT-ITaaS etc.), applications, virtual and physical networks has a different notion of continuity and it becomes extremely difficult to achieve combined continuity when dissimilar resources are combined. For example, a datacenter has several applications, heterogeneous hardware and processes. Each set of applications have their own notion of continuity based on their criticality and capability. In other words, the criticality of an application serving CRM data might be high but the criticality of an application serving financials might be even higher. The business continuity parameters in terms of time and data are high in the case of former and correspondingly higher for the latter. In the case of 100s of such applications and processes, all tied together under a single continuity expectation combined with the fact that each cloud resource has a certain continuity capability in terms of RPO/RTO and cannot exceed the said capabilities, it becomes almost impossible to offer uniform business continuity for all the resources together.

All the cloud platforms are not uniform in a cloud infrastructure and may offer different notions of continuity. Cloud platforms are essentially software stacks that give different capabilities in terms of continuity like hypervisor replication, replicated object buckets, resource specific orchestration, etc. For example, cloud platforms presently available in the market have different capabilities. Some cloud platforms does not have hypervisor based replication while some have. Some cloud platforms do have a hypervisor based replication which does not perform well. Some clouds do not have the ability to manage non windows based hypervisors completely while some clouds have the above said capability. The problem becomes complex when one has to offer business continuity across all kinds of technologies and platforms.

Available clouds may comprise legacy applications which are not cloud specific or are not intelligently responsive to the behavior of clouds. Legacy applications are prone to data continuity issues.

Inability of clouds to apply the same continuity parameters together to a set of resources like application sets, heterogeneous hardware, datacenters, branch offices etc. and achieve high levels of continuity. This is true even if applications are cloud specific due to interdependencies between application and the business process. For example, a single service level agreement (SLA) is applied which contains RTO/RPO, geographic preferences, operating model preferences like hot, warm, cold, etc. and other requirements to an ERP application that spans multiple datacenters, cloud software, storage arrays and networks. There is no infrastructure to ensure that such an operation can be considered or even carried out. This knowledge also implies that there is no provision today to ensure that the SLA itself can be maintained consistently. This is because business continuity was always managed end to end and depended on uniform hardware/software capabilities across the spectrum.

Dynamism of clouds which means continuous change in clouds with new capabilities, size of deployment, resource uses, infrastructure changes, workload migrations. Any continuity solution chosen must keep changing to adapt to the continuous changes in the clouds.

Lack of interoperability between dissimilar clouds. What may work in one cloud does not work in the other cloud. Standard infrastructures like storage, compute, network, application are converging together into a single hardware offering ensuring that massive scaling of resources is possible for the same datacenter footprint. Public clouds are pushing the technology envelope in a commoditized direction while private/hybrid clouds are clinging to the existing technologies and trying to retrofit the cloud for it.

Tiering of resources is seen as central to cloud management and this increases decision making complexity exponentially with tiers encompassing hypervisors, clouds, providers, services, applications, storage, compute and even networks.

Continuously variable demand from customers where services can be started/paused/continued/revised/resized/stopped fairly quickly which requires high levels of continuity.

Customers have different kinds of applications and expectations in terms of continuity parameters like cost, SLA's and level of protection and the service provider has to cater to them Maintenance of Service Level Agreements (metrics) across hundreds of protected resource profiles especially when they need to be balanced against catastrophic grid failures, over utilization of resources, multi tenancy and security profiles.

In order to provide continuity today there needs to be a 1:1 relationship between resources that are connected together as part of the continuity process and this requirement means that service providers cannot optimize on continuity cost using multi tenancy capabilities.

OBJECTS OF THE INVENTION

Accordingly, the primary object of the present invention is to provide a system and method which overcomes the above discussed disadvantages.

Another object of the present invention is to provide a system which is highly continuous across all type of data centers, dissimilar clouds, networks, applications, servers, etc. Highly continuous means stringent RTO/RPO parameters essentially reducing the time to recovery. Today as the number of variably operating entities like software, storage, networks, cloud orchestrators come into play the application workloads that span them start becoming less continuous because there is no predictability across dissimilar resources with varying and sometimes even orthogonal set of capabilities. A classic example is the way two different storage appliances operate. One offers geographically distributed replicas and the other offers federated volumes with managed access. The latter subsumes the former but is quite restrictive in terms of constant access to the volumes or objects exported from them.

Yet another object of the present invention is to provide a system and method using Software Defined Continuity which allows continuity practices or strategies to be virtualized and applied to any set of resources that need continuity and enable desired continuity to work across dissimilar clouds, diverse service provider infrastructure, heterogeneous technologies, multiple automation frameworks and geographies seamlessly.

Yet another object of the present invention is to provide a system and method to define and manage application continuity independent of infrastructure using Application Defined Continuity (ADC). ADC for applications is defined using ADC profiles. ADC profile include recovery goals, Service Level Agreements (SLAs), level of protection, recovery order, business priorities, cost, geographic preferences, operating mode preferences (hot/cold/warm/data-only etc.) and more. ADC profile can be defined per application. Further a profile can be defined for group of applications where goals and preferences are similar. Changing continuity needs can be addressed by switching from one ADC profile to another suitable ADC profile. A service provider creates additional ADC profiles for use with his business for end customers. Service provider will allow the end customer to use the ADC profile(s) directly or indirectly (using self-service portal) to meet the continuity goals with respect to their workloads. ADC also provides ADC Controller that translates these ADC profiles into continuity profiles that can be given to SDC implementation to provide continuity.

SUMMARY OF THE INVENTION

The present invention relates to system using software defined continuity (SDC) and application defined continuity (ADC) for achieving Business Continuity and Application Continuity for achieving business continuity and application continuity on massively scalable entities like entire datacenters, entire clouds etc. in a computing system environment.

Software Defined Continuity (SDC) allows continuity practices or strategies to be virtualized and applied to any set of resources that need continuity and enable desired continuity to work across dissimilar clouds, diverse service provider infrastructure, heterogeneous technologies, multiple automation frameworks and geographies seamlessly.

Application Defined Continuity (ADC) provides a way to define desired continuity as ADC profiles that can be consumed by SDC to provide required continuity. Software Defined Continuity (SDC) virtualizes continuities so that the strategy becomes just an entity that can be provisioned and attached to any set of resources irrespective of their capabilities.

Software Defined Continuity implies universal, fluid, intelligent, responsive, massively scalable Continuity Grids to maintain desired continuity across data centers, dissimilar clouds, applications, networks etc. by leveraging heterogeneous cloud infrastructure, replication technologies, storage hardware, Information Technology tools, hypervisor capabilities, service provider management utilities, cloud services and data centers.

Continuity Grids can be generally defined as elastic continuity container providing business continuity for resources contained by it in conjunction with one or more elastic container(s) that can be separated by time, geography, capability, infrastructure cost, usage, etc. Continuity Grids interchangeably called as Universal Continuity Grids (UCOG) or Grids are building blocks of a fundamental continuity infrastructure that is all pervasive and can work with any cloud platform. Each Continuer Grid is a holder of multiple resources. Every resource has a continuity strategy that needs to be applied to it and applying the strategy results in its continuity peers.

Continuity Peers are one or more Continuity Grids themselves where the resource peer relationship is transferred to the Continuity Grid. Each Continuity grid manages all the peer information and relationships for all member resources thus achieving high levels of optimization in cost, strategies deployed, resources used and also provides unlimited scale. Continuity grids in essence provide massive scalability and there is no fixed limit on the number of continuities strategies that can be added, number of resources that need protection or the number of resources that can share a particular continuity strategy.

Continuity Grids are linked with Continuity Peers that may or may not be in the same cloud, datacenter, geography or accessible location. Continuity Grids contain a set of resources that can be spread over the world. The resources can reside in company datacenters, service provider datacenters, public clouds, private clouds, etc.

Every UCOG can be considered as a dark grid with a wireframe. This wireframe is the template for the grid to be functionally successful when it is lit up in the future. Lighting up a UCOG makes it active in some form or the other and this means that a Continuity Grid can exist in varying functionally reduced states befitting the need at the time. Wireframe consist of basic services required for functioning of grid and default or empty configuration values for Continuity Blue Print.

Continuity Blue Prints are live Continuity Blue prints for enabling continuity on any UCOG. Continuity Blue Print includes all the knowledge of the wireframe with actual resources discovered/applied, policies/SLAs, resilience checks, resilience drill schedule, verification actions, validations, reporting, monitoring policies, continuity strategies, continuity peer information, etc. Updations of Continuity Blue Print happens due to entity/resource fingerprinting during the self-aware discovery process where a UCOG discovers its members or when commands supplying specific information is released into the UCOG from external sources. UCOGs can be pre-allocated or dynamically instantiated based on enforced policies. Fingerprinting of resources is finding details of resource in terms of the type of resource (like network, storage, server), capabilities (like SSD Storage), and capacity (like number of CPU).

The wireframe starts out as an initial blueprint with default or empty values. UCOG actively fingerprints everything under its control and fills out the blueprint with practical values from the installations it manages and ends up with its own Continuity Blue Print. Once the Continuity Blue Print is setup and operating, the UCOG automatically starts to manage the entire process of ensuring continuity within all UCOG members. Each UCOG is self-managing and hence a parent UCOG is the sum total of its entire member UCOGs. UCOGs can be envisioned as approximating very closely the exact datacenter granularity and hence fits easily into the model that is ready to be administered. UCOGs are setup to discover, isolate and manage resources in the style of the datacenter like servers in a network, VMs in a hypervisor, storage arrays in a power bank, etc. Even though a single datacenter can have multiple clouds and multiple technologies deployed, the continuity grid can evolve to fit the vision of the customer of a cloud service as well as the cloud service provider himself The heart of the Continuity Blue Print is the continuity operations per second that are needed for the Continuity Blue Print to function. It is a sum total of all operations that are performed within the Continuity Grid for the Continuity Blue Print to maintain continuity metrics. Every Continuity Blue Print has the said Continuity Operations filled out. When resources are added or removed to/from the UCOG, the values of the said Continuity Operations are automatically adjusted to reflect the altered continuity capabilities of the UCOG. In this way, each UCOG is a self-evolving entity that can consume data from the grid and beyond to enforce policies, reactions, actions and instrumentations. It automatically keeps account of the planned Continuity Operations, fingerprinted said Continuity Operations and the deviations so that every service provider can automatically generate costs on the grid. Costs are generally units agreed to between the service provider and the grid and may be tabled in a computable form.

UCOG's further simplifies the job of any service provider or customer by automatically designing continuity blueprints on a fly that work for their selected UCOG and ADC/Continuity profile and then deploys them, computes costs for them, monitors them and ensures that the UCOG is continuously available according to their selected metrics. The crux of the Application Defined Continuity (ADC) architecture is the ADC Controller. ADC Controller translates the chosen ADC profile for a workload into continuity template(s) so that SDC can provide continuity. Workload may be an application or server or storage or entire data center and the like. ADC constitutes Application Programming Interfaces (APIs) for integration with infrastructure/cloud management software. Service providers can make use of these APIs to offer continuity services to end customers.

ADC profile describes continuity requirements and operating parameters as needed by protected application. The continuity parameters are not limited to RPO, RTO, resource types, costs, policies, geographical location preference, number of resilience check (drill) etc. It can also include application infrastructure requirements, dependencies and business priorities.

System may have predefined ADC profiles. Service provider may create new ADC profiles based on their infrastructure, customer preferences and application architecture and business model using ADC APIs. These ADC profiles can then be available to the end customer or primary workload owner for providing continuity.

The UCOG scales elastically whenever resources are added to it and maintains SLAs as dictated by ADC profile to the highest degree possible within the ambit of the enclosing infrastructure. UCOGs are self-aware in terms of resources managed, continuity strategies, resource accounting, cost management, SLA metrics, available resources, continuity peers, etc.

Every UCOG may scale to enclose member UCOGs or sub-UCOGs inside them. This scaling is infinite and can eventually map the entire known universe or entire system. Typically UCOGs are automatically selected based on common resource type, functionality, protection dependencies, application cohesion, geographical location, etc. UCOGs can be used to map entire datacenters or even businesses with correlated sub-grids inside them thus rendering a single Continuity Blue Prints for the entire set and homogenous handling of continuities across the spectrum. When UCOGs enclose sub-grids, all UCOG information is statistically a summary across all the sub-grids and is dynamically computed and presented whether it is for monitoring, reporting, cost accounting, blueprints, resources, etc.

Each continuity grid comprises or has an access to modules such as Data center Acquisition Module, Virtual and Physical Resource Management Module. Fully Automated continuity Tiering (FACT) Module, Elastic Continuity Grid (ECG) Module, Continuity Optimization and Reasoning Engine (CORE) Module, Application Continuity Tethering Services (ACTS) Module, Continuity Universe (CONVERSE) Module, Cost and Accounting Module, Blue Print Management Module, Grid Execution Services Module, ADC API, ADC Controller, Information Exchange/API Layer, Communication and Access Layer, Service Provider Interface and End User Interface.

Continuity to a workload or resource using software defined continuity (SDC) and application defined continuity (ADC) for achieving Business Continuity and Application Continuity comprises starting the continuity provisioning by end user or service provider or automatically or as and when new workloads are added. Thereafter, the resources or workloads are fetched by the system. The ADC profile of the said resources or workload is provided as input by end users or service provider. Thereafter, Continuity Grids are selected based on the ADC profile provided by the end user. The selected continuity grid identifies or creates sub grids in the parent Continuity Grid and updates the Continuity Blue Print of the Parent Grids with the knowledge of the sub grids. Thereafter, the sub grids of the parent grids starts resource discovery for the continuity operations and fingerprints the discovered resources. The Continuity Blue Prints of the Continuity Grids are updated with the discovered resources. Thereafter, the system computes parameters such as number of continuity operations required, continuity strategy needed, Geo Placements, cost optimizations by sub grids based on resources/workload and ADC profile. The Continuity Blue Prints of the sub grids are then updated with the said resource information. Thereafter, continuity peer grids are found in the system that can satisfy continuity requirements of the sub grids. The said continuity peer grids are paired with said sub grids and the blue prints of both the sub grids and the continuity pair grids are updated. The number of continuity operations available with sub grids and parent grids are adjusted with the number of continuity operations needed to provide continuity for given resource/workload. Thereafter, the system manages continuity, costs, resource details and the like and percolates the information upwards to parent grids and updates blue prints with changes.

The present invention also describes a method to reserve resources for creation of continuities where administrators or service providers reserve resources which can be used for providing continuities for pre-defined continuity profiles. The continuity provisioning is created by creating resource pools and conducting a feasibility check of the created and selected resource pools with predefined continuity profiles. In case, the capabilities of the selected resource pool matches with the pre-defined continuity profiles, the resources are selected to provide continuities. Continuity Grids encapsulating these resource pools now updates the available continuity operations with additional Continuity operations. The said module also estimates the cost of providing continuity based on resource cost map. The said continuities are also advertised so that tenant/service providers looking for continuity can find it.

DETAILED DESCRIPTION OF THE INVENTION

The exemplary embodiments of the present invention provide a system and method using Software Defined Continuity (SDC) for achieving Business Continuity across entities and Application Defined Continuity (ADC) for the applications to define and request their continuity requirements. The Business Continuity will be maintained on massively scalable entities such as entire data centers, entire clouds, application/services that span data centers/clouds, virtual companies, virtual offices, network segments etc. that scale massively with respect to resources like servers, networks, storage, etc. that are contained within them.

Software Defined Continuity (SDC) allows continuity practices or strategies to be virtualized and applied to any set of resources that need continuity and enable desired continuity to work across dissimilar clouds, diverse service provider infrastructure, heterogeneous technologies, multiple automation frameworks and geographies seamlessly.

Application Defined Continuity (ADC) provides a way to define desired continuity as ADC profiles that can be consumed by SDC to provide required continuity. Software Defined Continuity (SDC) virtualizes continuities so that the strategy becomes just an entity that can be provisioned and attached to any set of resources irrespective of their capabilities.

Figure 1:
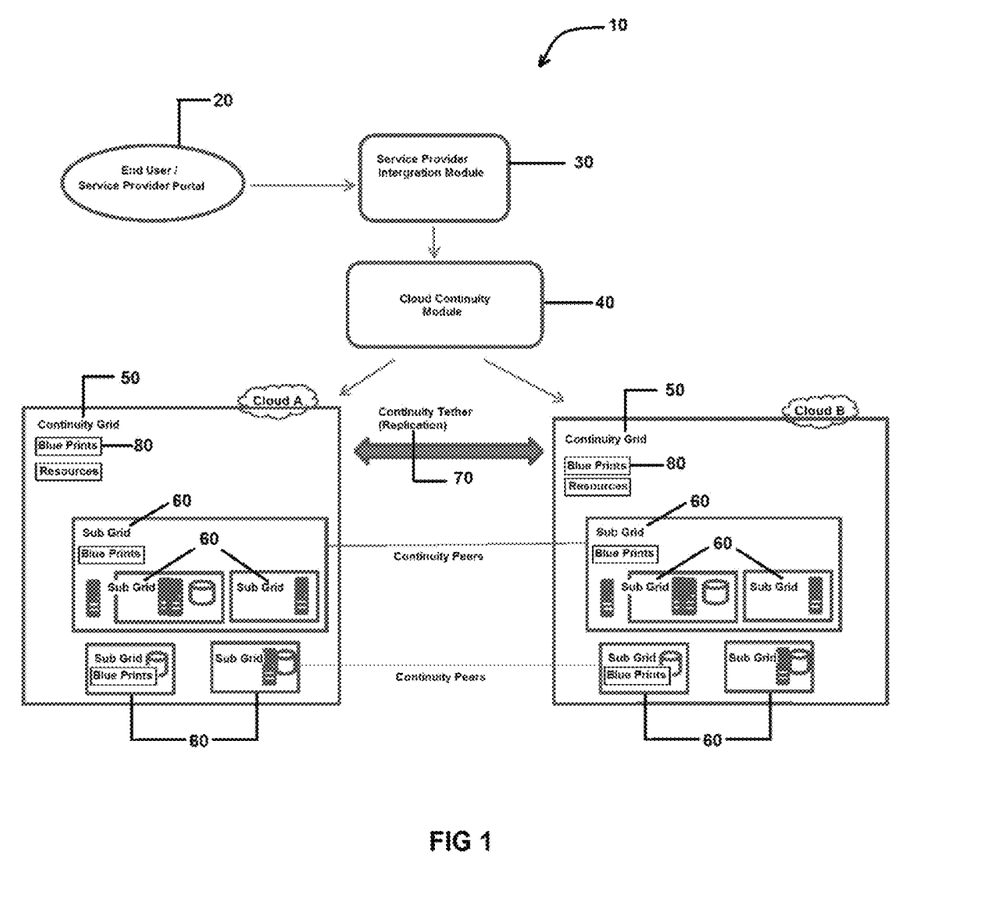
FIG. 1 is a diagram illustrating an exemplary environment in which the system using software defined continuity for achieving business continuity on massive scalable entities operates.

FIG. 1 is a diagram Illustrating an exemplary environment in which the system using Software Defined Continuity (SDC) and Application Defined Continuity (ADC) for achieving business continuity on massively scalable entities operates.

According to an exemplary embodiment, a system 10 of the present invention comprises a Service provider/End user Portal 20 connected to a Cloud Continuity Module 40 through Service Provider Integration module 30.

Cloud Continuity Module 40 implements Software Defined Continuity as described in the present invention. Cloud Continuity Module 40 may be connected to one or more clouds. In FIG. 1 of the present invention, the Cloud Continuity Module 40 is shown to be connected to Cloud A and Cloud B.

The said clouds comprise one or more Continuity Grids 50 interchangeably called as Universal Continuity Grids (UCOG) or Grids 50 which are building blocks of a fundamental continuity infrastructure that is all pervasive and can work with any cloud platform.

Every Universal Continuity Grid (UCOG) 50 is configured to be a holder of multiple resources such as, being not limited to, servers, storage, network, switches etc. Every UCOG 50 may scale to enclose member UCOGs 50 or sub Grids 60. This scaling is infinite and can eventually map the entire known universe. Every resource has a continuity strategy that needs to be applied to it and applying the strategy results in continuity peer of the said resource which may be located anywhere in the known universe i.e. in the entire system 10 of the present invention. Continuity peers are one or more Continuity Grids 50, 60 themselves where the resource peer relationship is transferred to the Continuity Grid 50, 60. Any number of Continuity peers can exist in the known universe or the system 10.

Each Continuity Grid 50, 60 manages all the continuity peer information and relationships for all member resources thus achieving high levels of optimization in cost, strategies deployed, resources used and also provides unlimited scale. Continuity Grids 50, 60 in essence provide massive scalability and there is no fixed limit on the number of continuities strategies that can be added, number of resources that need protection or the number of resources that can share a particular continuity strategy. For example if a grid $G_A$ in location A comprising some applications, servers, storage and networks and its continuity peer is a grid $G_B$ in location B (which could be anywhere in the known universe or system 10) then the following conclusions may be made:
1. $G_A$ and $G_B$ are continuity peers and this mean that all the servers, applications, storage, networks, etc. in $G_A$ are continuous with all servers, applications, storage, networks in $G_B$
2. If a failover of $G_A$ was done to $G_B$ then all resources within $G_A$ failover to resources within $G_B$
3. Grid $G_A$ has a blueprint (as does grid $G_B$) for continuity that applies to all resources of $G_A$
4. Continuity strategies if applied to the grid $G_A$ will apply to all resources of $G_A$ unless there are resources that are incompatible with the applied strategy
5. Grid $G_A$ will manage all continuities for all resources within it and so will grid $G_B$ (grid $G_B$ might have resources that are linked with some other grid $G_C$)

Continuity Grids 50, 60 are linked with Continuity Peers that may or may not be in the same cloud, datacenter, geography or accessible location. Continuity Grids 50, 60 contain a set of resources that can be spread over the world. The resources can reside in company datacenters, service provider datacenters, public clouds, private clouds, etc. For example an ERP application that has transactional data in highly available storage within the data center that the application resides in, archival storage in a public cloud facility, medium term backup data in a different geographical region within a different service provider. When such a Continuity Grid 50, 60 has to be peered with another Continuity Grid 50, 60, the Continuity Peer grid has to transcend geographies, network topologies, cloud software, cloud providers, etc. Continuity Grids 50, 60 are essentially stateless and can be run on any piece of server hardware. The Continuity Grids 50, 60 mimic the cloud behavior by being independent of the hardware it resides on and independent of the location it is running in which means that a Continuity Grid 50, 60 in a specific location can have resources that are 1000s of miles away. Continuity Grids 50, 60 control all continuity activities on the resources within them. Continuity Grids 50, 60 are software instances that can be run on any server and from any location.

Every Continuity Grid 50, 60 comprises linking means that links all data movement from one UCOG 50, 60 to its Continuity Peers. In one embodiment, every Continuity Grid 50, 60 comprise a tether 70 that links all data movement from one UCOG 50, 60 to its Continuity Peers. All UCOG's 50, 60 including sub-UCOGs 50, 60 can teleport their tether 70 to the parent UCOG 50, 60 and use its functionality or can elect to farm its own. In effect any data pipelined out of the UCOG 50, 60 flows through the tether 70. The tether 70 is configured to pipeline or multiplex all data traffic based on policies. The tether 70 is configured to control and transform the data put on its wire into any shape or form of its choosing which means that even default data movement functionality can be affected by the tether 70. The tether 70 is not only a data router but also a control frame router and can handle/sequence all traffic between two or more Continuity Peers.

Every UCOG 50, 60 starts out being a dark grid with a wireframe. This wireframe is the template for the Continuity Grid 50, 60 to be functionally successful when it is lit up in the future. The Continuity Grid 50, 60 can be lit up by the administrator/service providers on demand or through automatic policies. Lighting up a Continuity Grid 50, 60 makes it active in some form or the other which means that a Continuity Grid 50, 60 can exist in varying functionally reduced states befitting the need at the time. Wireframe consist of basic services required for functioning of the Continuity Grid 50, 60 and default or empty configuration values for a Continuity Blue Print 80. The default services may be, not being limited to, resource discovery service, monitoring services, or the like etc.

When a tenant/end user/service provider asks for continuity for one or more applications and specifies service level agreements (SLA), a UCOG 50, 60 is made available for the tenant/end user/service provider in accordance with his requirements such as Recovery Point Objectives (RPO) or resource sizes for recovery etc. As the selected UCOG 50, 60 scans different type of resources and applications in accordance with requirements of the said application, it can form other sub UCOG's 50, 60 or member UCOG's 50, 60 for each application or for different resource type. Each of the said UCOG 50, 60 while scanning of the resources starts filling Continuity Blue Print 80.

Continuity Blue Prints 80 are live continuity blue prints for enabling continuity on any UCOG/sub-UCOG 50, 60. Continuity Blue Prints 80 include all the knowledge of the wireframe with actual resources discovered/applied, policies/SLAs, resilience checks, resilience drill schedule, verification actions, validations, reporting, monitoring policies, continuity strategies, continuity peer information, or the like etc.

The wireframe starts out as an initial blueprint with default or empty values updation/filling of Continuity Blue Prints (80) happens due to entity/resource fingerprinting during the self-aware discovery process where a UCOG/sub UCOG 50, 60 discovers its resources/members or when commands supplying specific information are released into the UCOG 50, 60 from external sources. UCOGs 50. 60 can be pre-allocated or dynamically instantiated based on enforced policies. Fingerprinting of resources is finding details of resource in terms of the type of resource (like network, storage, server), capabilities (like SSD Storage), capacity (like number of CPU) and the like UCOG's/sub UCOG's 50, 60 actively fingerprints everything under its control and fills out the Continuity Blueprint 80 with practical values from the installations it manages and a given ADC/Continuity profile and ends up with its own Continuity Blue Print 80.

The system 10 of the present invention simplifies the job of any service provider/tenant/end user by automatically designing Continuity Blueprints 80 on a fly that work for the selected UCOG+SLA (Service Level Agreement) profile and then deploys them, computes costs for them, monitors them and ensures that the UCOG 50, 60 is continuously available according to the selected metrics of the provider/tenant/end user. The UCOG 50, 60 is prompted to scale elastically whenever resources are added to it and maintains SLAs to the highest degree possible within the ambit of the enclosing infrastructure. UCOGs 50, 60 are self-aware in terms of resources managed, continuity strategies, resource accounting, cost management, SLA metrics, available resources, continuity peers, etc.

Once the Continuity Blue Print 80 is setup and operating, the UCOG's 50, 60 is prompted to automatically start to manage the entire process of ensuring continuity within all UCOG members 50, 60. Each UCOG 50, 60 is self-managing and hence a parent UCOG is the sum total of its entire member UCOGs 50, 60. UCOGs 50, 60 can be envisioned as approximating very closely the exact data center granularity and hence fits easily into the model that is ready to be administered. UCOGs 50, 60 are setup to discover, isolate and manage resources in the style of the data center like servers in a network, VMs in a hypervisor, storage arrays in a power bank, and the likes. Even though a single data center can have multiple clouds and multiple technologies deployed, the Continuity Grid 50, 60 can evolve to fit the vision of the customer of a cloud service as well as the cloud service provider itself.

UCOGs 50, 60 may be automatically selected based on common resource type, functionality, protection dependencies, application cohesion, geographical location, etc. UCOGs 50 may also be used to map entire datacenters or even businesses with correlated sub grids 60 inside them thus rendering a single Continuity Blue Print 80 for the entire set and homogenous handling of continuities across the spectrum. When UCOGs 50 enclose sub grids 60, all UCOG's 50 information is statistically a summary across all the sub grids 60 and is dynamically computed and presented whether it is for monitoring, reporting, cost accounting, blueprints, resources, etc.

The heart of the Continuity Blue Print 80 is Continuity Operations that are needed for the Continuity Blueprint 80 to function. It is a sum total of all operations that are performed within the Continuity Grid 50, 60 for the Continuity Blueprint 80 to maintain continuity metrics. Every Continuity Blue Print 80 has the Continuity Operations filled out. When resources are added or removed to/from the Continuity Grid 50, 60, the values of Continuity Operations are automatically adjusted to reflect the altered continuity capabilities of the Continuity Grid 50, 60. In this way, each UCOG 50, 60 is a self-evolving entity that can consume data from the Continuity Grid 50, 60 and beyond to enforce policies, reactions, actions and instrumentations. The system 10 is configured to automatically keep account of the planned Continuity operations, actual continuity operations and the deviations so that every service provider can automatically generate costs on the Continuity Grid 50, 60. Costs are units agreed to between the service provider and the Continuity Grid 50, 60 and may be tabled in a computable form.

Continuity Grids 50, 60 are self-tuning and can change continuity strategies on a fly to adjust for load changes, emergency situations, exception handling and based on datacenter policies. This allows the said Continuity Grids to be highly flexible and also enables best effort Service level Agreement (SLA) delivery at all times. Continuity Grids 50, 60 will also inspect the resources and automatically provision service primitives that can be used by the service provider to offer enhanced services to their customers. Every Continuity Grid 50, 60 is completely self-aware with respect to, being not limited to, resources owned by it, continuity peer information, actions that it can perform, events that it can analyze, workflow sequences it can initiate, reports that it generates, metadata, parent information, operating state and continuity meter and display for monitoring and analysis.

Every UCOG 50, 60 rely on a Continuity Meter that is a combination of a fixed values and live measurements. The Continuity Meter tells the UCOGs 50, 60 whether any members of its Continuity Grid 50, 60 have phase shifted in violation of what was promised earlier. The Continuity clock meter is a multi-phase device with multiple dials. In one embodiment, the continuity clock/meter is a multi-phase device with four basic dials such as, being not limited to:

Service Level Agreement (SLA) metrics dial espoused by the service level provider providing details such as, being not limited to, Recovery Time Objective (RTO) or Recovery Point Objective (RPO).

Continuity Phase Shift dial which forces selection between parameters such as, being not limited to, continuity, active recovery, backup and archive.

Geographical Proximity dials which determines the type of operation that is required to support what is desired.

Desired cost dial to provide the desired cost by the Service level providers/end users.

It is possible that above identified values are in violation of each other and each UCOG 50, 60 goes through a normalization process initially to rationalize the values of the clocks. Once the said values are in sync, the UCOG 50, 60 is fully functioning and knows what needs to be done about continuity maintenance for the said Continuity Grids. It is possible that the Continuity Grids 50, 60 have sub-grids that have continuity clocks that are much more stringent than the parent Continuity Grid 50, 60 and in this case the said Continuity Grid Continuity meters fixed values are the lowest common denominator of all of its sub-grids.

Every UCOG 50, 60 has certain capabilities based on its functional intelligence, fingerprinted or actual resources, Continuity operations, and the likes. In case of tiered resources, the cost is factored additionally and when the Continuity Grid 50, 60 is queried for a particular cost, the Continuity Grid 50, 60 is prompted to compute the operations and the costs and provides the answer whether the said continuity operation is possible or not. Thus, each Continuity Grid 50, 60 is like a cost calculator that can decide quickly whether a particular continuity meter value is attainable or not within its Continuity Grid 50, 60. If it is attainable, a resource can be added into the Continuity Grid 50, 60 for protection. If it is not attainable, a resource is rejected. The said feature allows administrators to define and maintain cost centers for each Continuity Grid 50, 60 and provision resources appropriately. Each UCOG 50, 60 is highly elastic (fluid) and can accommodate multiple resources. As and when resources are added and capabilities increased, the cost computation is synchronized along with the continuity meter value updations.

In order to further define the working of Continuity Grids 50, 60, it is necessary to define the Continuity Grids 50, 60 along with continuity itself. Continuity can be defined as the phase shift in time (zero to whatever) along with, being not limited to, the following parameters:

1. Geography (cluster, availability zones, metro connect location, wan fiber connect location etc.)
2. Operational level (data only, data and application continuity, etc.) which really is functional continuity. Functional Continuity means that a Grid can have only a few applications operating and the grid is deemed functionally continuous Based on the above, the definition of continuity handled by each UCOG 50, 60 can be defined as phase shift along with geography and operational levels (phase shift+geography+operational level) which will be handled by all Continuity grids 50, 60.

The said definition of continuity allows each and every UCOG 50, 60 to handle all continuity requirements without losing primary focus which means that the requirement could be for only certain portions of the UCOG 50, 60 to be lit at any point of time and even then the UCOG 50, 60 itself may be continuous but not as functional. The continuity operations are, therefore, patterned to make this possible and enable each UCOG 50, 60 to be fully equipped with the knowledge and expertise to repair, renegotiate and resume continuity at all times.

Every UCOG's 50, 60 continuity operations are the function of, being not limited to, the following parameters and every UCOG 50 is a summation of all the different sets of continuity operations across all sub grids 60.

Data stored as part of the continuity operation;
Data read/written as part of all continuity activities;
CPU used which is percentage of CPU used per second; and
Data moved as operations per second All UCOG wireframes will have standard (assumed) costs that can change when resources are fingerprinted. Each UCOG 50, 60 is a self-learning entity that observes the activities within the said Continuity Grids 50, 60 and re-computes computing operations to reflect the new capabilities. This is also done when the Continuity Grids 50, 60 are resized.

Continuity Grid Operations can be defined as $\Sigma_{G0}^{Gn}$ a CSGi where $CSG_i$ is the sub UCOG entity 60 and $G_n$ is the total number of sub UCOGs 60 within any Continuity Grid 50. Every Continuity Grid 50, 60 will have the Continuity Grid Operations filled out after discovering its capabilities. In order to figure out whether the Continuity Grid Operations will work for estimation, the rate of change and bandwidth on display will be input or discovered. The default assumptions are based on the wireframe and will exist regardless of discovery.

The fundamental aspects of every UCOG 50, 60 that form the basis for resource optimization, uniform scaling, functional overriding, etc. are, not being limited to, as follows:

1. Teleporting: Every resource, service, data store can on demand maintain continuity for itself by relaying its functionality to some other component in a different location. That means UCOG 50, 60 is highly continuous not only to the resources that it manages but also to itself. The said capability will ensure that if a UCOG 50, 60 fails another UCOG 50, 60 can takeover immediately if required. It also means that load balancing and scaling is an integral component of each and every Continuity Grid 50, 60. It further means that any number of UCOGs 50, 60 can collapse into a single UCOG 50, 60 thus allowing UCOG 50, 60 convergence at any time leading to massive scalability and manageability upticks.
2. River: All UCOGs 50, 60 share a river that runs through them only in the upstream direction from innermost UCOG 50, 60 to outermost/parent UCOG 50, 60. Any UCOG 50, 60 in the path can fish in the river and retrieve interested information, act on it and add further super events onto the river for vertical consumption. This is the foundation of the UCOG 50, 60 architecture and creates a continuous stream of hierarchically summarized information that flows up.

Discovery within a UCOG 50 happens by pushing discovery process down to sub UCOGs 60. UCOG 50, 60 are completely stateless and hence can use any resource to be alive. Typically each UCOG 50, 60 will have a resource map and once a UCOG 50, 60 is lit up, the said UCOG 50, 60 starts exploring a map and filling in the information. The amount of in core information within a UCOG 50, 60 is very little thus allowing it to scale easily. Standard discovery intelligence exists in the system 10 that brings the said map to life. Typically, the intelligence within the UCOG 50, 60 is more about what to do with certain information returned by the discovery service. The actual intelligence of running discovery and probing a resource or even comparing a new resource map with the old one is done by the discovery service which can be teleported. Discovery might mean reading the Configuration management database or some other cloud source. It also means integrating with the cloud stack to discover its components. If a certain resource that exists in the map is not discovered, it remains dark within the UCOG 50, 60. Basically a grid can go through several operating states. In one embodiment of the present invention, it starts of as totally dark because it has been switched off and it is not playing an active part in the continuity process. Once switched on, it is yellow because it is not continuous until it finds its peer and links to it. Once linked to the continuity peer it becomes green. Depending upon the criticality of the missing resource or failed resources the UCOG 50, 60 might also go to yellow-dark, red-dark, yellow-yellow, red-red, etc. instead of green-green and this is true of all sub UCOGs 60 as well. Each UCOG 50, 60 can thus be independently monitored and drilled down to the desired level.

Continuity may also be defined as a bunch of UCOG policies about what to do and may be allowed to change over time. Policies may also dynamically change based on UCOG discovery. It also means that continuity can be modified based on overall expectation. Continuity of a UCOG 50, 60 may start out with a mix of continuity types and may be upgraded based on demand. Upgrading UCOG continuity means that all continuities are upgraded if required. Priorities are only for overriding actions within the Continuity Grid 50, 60. Continuity may also be defined as a time piece with different clocks for different data. It is possible that a single UCOG 50, 60 is highly continuous in different parts and lowly continuous in other parts. Each UCOG 50, 60 knows what its continuity should be and whether sub UCOGs 60 have overridden its settings. This is also the reason why sub UCOGs 60 have their own identity. A sub UCOG 60 that is highly continuous may be serving as the hot standby for another UCOG 50-sub UCOG 60 but have no role in its encompassing UCOG 50, 60 or vice versa.

Based on demand, the continuity state of UCOGs 50, 60 might be changed. There might be a set of actions that are required to get this action done and may not be instantaneous. This also means that applications with different continuities exist, users with different continuities exist and so do services. Service continuity is the ultimate differentiator for any end user-service provider pair. Dark UCOGs are those for which there may be infrastructure allocated but not being used and may be used for other purposes until required. The said dark UCOG may be more of a reservation or a UCOG that has been downgraded from highly continuous to not continuous. Data resources of said dark UCOG are consumed and the UCOG 50, 60 has affiliation for resources but no current usage. These UCOGs can be lit up for transient purposes and then switched off again.

UCOGs 50, 60 can be promoted from lowly continuous to highly continuous at any time. It is also possible that a UCOG 50, 60 might permanently teleport to another UCOG 50, 60 and also a UCOG 50, 60 itself might be cloned elsewhere and the existing UCOG 50, 60 demoted/dismantled.

Commands such as Yield orchestrated uniform grid obtrusions (YOUGO) commands flows the UCOG 50, 60 from highly operational to lowly operational without changing the data continuity process or at least without dropping data continuity altogether. On the other hand, the YOUGO commands may also necessitate a complete loss of continuity as well. UCOGs that have lost continuity because of a prior YOUGO command can be initialized again to start being continuous. This means that a UCOG 50, 60 can lose continuity and can wait until it is reestablished either because of its own efforts or because of something else and once intimated each grid will be able to connect with its continuity peer.

Continuity Grids 50, 60 share a universal namespace that is independent of clouds, datacenters, resource names and the likes. This allows any Continuity Grid 50, 60 to be found by any other Continuity Grid 50, 60 across the world and still retain characteristics of the location it is in which makes it easy for continuity peers to find each other. A UCOG 50, 60 can have another UCOG 50, 60 as a continuity peer as well. A UCOG 50, 60 can be made of one or more sub-UCOGs 60 that have continuity peers scattered around the world. UCOGs 50, 60 may be independently monitorable through their well known address using the Continuity Grid Access Protocol (CGAP). CGAP is a data driven namespace protocol used by all grids worldwide. Each UCOG subscribes to the portion of the CGAP it wants to see and gets it appropriately. The CGNS service is a consumer of the CGAP protocol that is run by all UCOGs 50, 60. All registrations, erasures, modifications are reported through the CGAP protocol to interested parties. CGAP is a distributed replica based continuity grid yellow pages that enable fast lookup with local caching logic.

Figure 2:
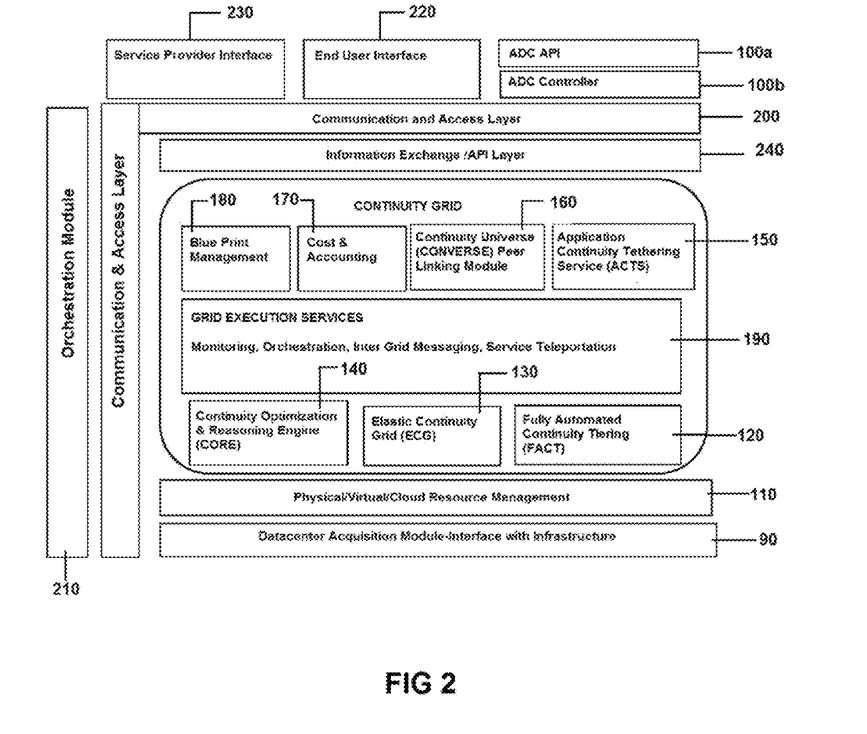
FIG. 2 is diagram illustrating the software architectural module of the system according to the present invention.

FIG. 2 is diagram illustrating the software architectural module of the system 10. Each grid has access to or comprises the following major modules:

Datacenter Acquisition Module—

Datacenter Acquisition Module 90 is configured to integrate with Hardware and Software infrastructure Application Programming Interface (API) 100a to discover data center resources and topology. Some of the technologies the Datacenter Acquisition Module 90 interface with are, not being limited to, VMware Cloud API, Microsoft System center API, storage management API, network management API or the like etc.

Virtual and Physical Resource Management Module 110—

Virtual and Physical Resource Management Module 110 manage the resources to be used for providing continuity. The said module 110 is configured to interface with Datacenter Acquisition Module 90 to discover resources. The said module 110 is also configured to keep inventory of resources and tracks addition and removal of resources. The said module 110 further configured to treat physical and virtual resources commonly.

Fully Automated Continuity Tiering (FACT) Module 120—

FACT module 120 generates the list of all possible continuities that can be provided by a given Continuity Grid 50, 60. The said module 120 is configured to scan the Continuity Grid resources and also configured to read the supported continuity profiles. Based on type of resources and continuity profiles, the said module 120 is configured to generate the type and number of continuity that can be provided by the Continuity Grid 50, 60.

Elastic Continuity Grid (ECG) Module 130—

Elastic Continuity Grid (ECG) Module 130 is configured to provide elasticity in terms of addition of workloads for protection or change in existing workload that is under protection. The said Module 130 has interface that detects or receive the change or request for new workload protection. For input request, ECG module 130 is configured to read through sets of defined policies and finds policy to handle the request for new workload protection. The end result of the said request for new workload protection is a workflow that handles the change.

Continuity Optimization and Reasoning Engine (CORE) Module 140—

CORE module 140 provides all the intelligence that is required for the Continuity Grids 50, 60 to take decisions. The decisions may be, not being limited to, choosing peer Geo Location, continuity strategy that can satisfy continuity SLA for given workloads etc. The said module 140 is configured to implement as set of policies/rules and an engine that can apply these rules on input i.e. workload and continuity requirements to choose continuity strategy and Geo Location.

Application Continuity Tethering Services (ACTS) Module 150:

Application Continuity Tethering Services (ACTS) Module 150 provides ability to transfer data from one Continuity Grid to another Continuity Grid. Data transfer is one of the most critical processes in providing continuity. Data transfer is achieved by using various replication techniques. The said module 150 may use replication provided by storage vendors such as, not being limited to, EMC SRDF, NetApp Snapmirror or host base replication like Symantec VVR, Sanovi SFR etc. The said module 150 is configured to provide a virtualized view of replication resources in such a way that when the Continuity Grid 50, 60 demands for replication between two locations, the storage vendors need not worry about which underlying replication technique is used.

Continuity Universe (CONVERSE) Module 160:

Continuity Universe (CONVERSE) Module 160 is a peer linking services that helps Continuity Grids 50, 60 to find its Continuity Peer Grids that can satisfy its continuity requirements. Each Continuity Grid 50, 60 exposes its continuity capability i.e. Continuity strategies it can support and number of such continuities it can support. All Continuity Grids 50, 60 exchange this information and forms continuity yellow pages that can be used to search for required continuity. When there is a need to provide continuity to a workload, continuity yellow page directory is configured to search to find Continuity Peer Grids that can provide required continuity.

Cost and Accounting Module 170:

As each Continuity Grid 50, 60 is self-accountable, the Cost and Accounting Module 170 keeps track of cost for maintaining continuity. The said module 170 is configured to keep a track of cost of operations such as recovery, drills etc. The said module 170 further configured to keep the cost of resources based on resource types and keeps track of resource usage so that cost can be appropriately measured.

Blue Print Management Module 180:

The Blue Print Management Module 180 manages the Continuity Blueprint 80 for the Continuity Grids 50, 60. Continuity Blue Prints 80 for the said Continuity Grids 50, 60 defines how continuity is provided. It contains continuity strategy being used (e.g. what replication is used), configured and run time continuity meters values (RPO/RTO/data lag), recovery steps, number and frequency of drills to be performed. The said module 180 is also configured to provide grid view monitoring per customer or tenant. The said module 180 is configured to generate report, trends and chart for all activities.

Grid Execution Services Module 190:

Grid Execution services module 190 provides common services that may be, not being limited to, monitoring services that monitors resources or failures in continuity operations, orchestration services to execute actions in workflow, inter grid messaging services, or the like etc.

ADC API (Application Programming Interface) and ADC Controller:

ADC API (Application Programming interface) 100a and ADC Controller 100b are part of Application Defined Continuity (ADC) that gives ability to define Application continuity using ADC profile. The crux of the Application Defined Continuity (ADC) architecture is the ADC Controller 100*b*. ADC Controller 100*b* is configured to translate the chosen ADC profile for a workload into continuity template(s) so that SDC can provide continuity.

ADC constitutes Application Programming Interfaces (APIs) 100*a* for integration with infrastructure/cloud management software. Service providers can make use of these APIs to offer continuity services to end customers.

ADC profile of an application is created using ADC API 100*a* and then ADC controller 100*b* translates the said ADC profile into a continuity template such that software defined continuity (SDC) can provide continuity. ADC APIs may be implemented as RestFul APIs. ADC profile information may be modeled as XML. ADC profile describes continuity requirements and operating parameters as needed by protected application. The continuity parameters are not limited to RPO, RTO, resource types, costs, policies, geographical location preference, number of resilience check (drill) etc. It can also include application infrastructure requirements, dependencies and business priorities.

The system 10 may have predefined ADC profile. Service providers can create new ADC profiles based on their infrastructure, customer preferences and application architecture and business model using ADC APIs. The said ADC profiles can then be available to the end customer or primary workload owner for providing continuity.

Information Exchange/Application Programming Interface (API) Layer:

API layer 240 is provided to expose Continuity Grid functionality which can be used by Service Provider Interface 30 and End User Interface 20. The said API layer 240 is also used for inter Grid communication. API Layer 240 covers areas like reports, monitoring, workload selection, update of continuity parameters etc.

Communication and Access Layer:

Communication and Access layer 200 provides, being not limited to, communication protocol and authentication mechanism to access Continuity Grid and services provided by the said Continuity Grid.

Orchestration Module:

Orchestration module 210 provides ability to orchestrate operations across Continuity Grids/Clouds.

Service Provider Interface and End User Interface:

Service Provider Interface 230 and End User Interface 220 integrate Service provider portal 30 and end user portal 20 with continuity grids. The said interfaces also provides interface to offer functionality like reports, monitoring, workload selection, update of continuity parameters etc.

Figure 3:
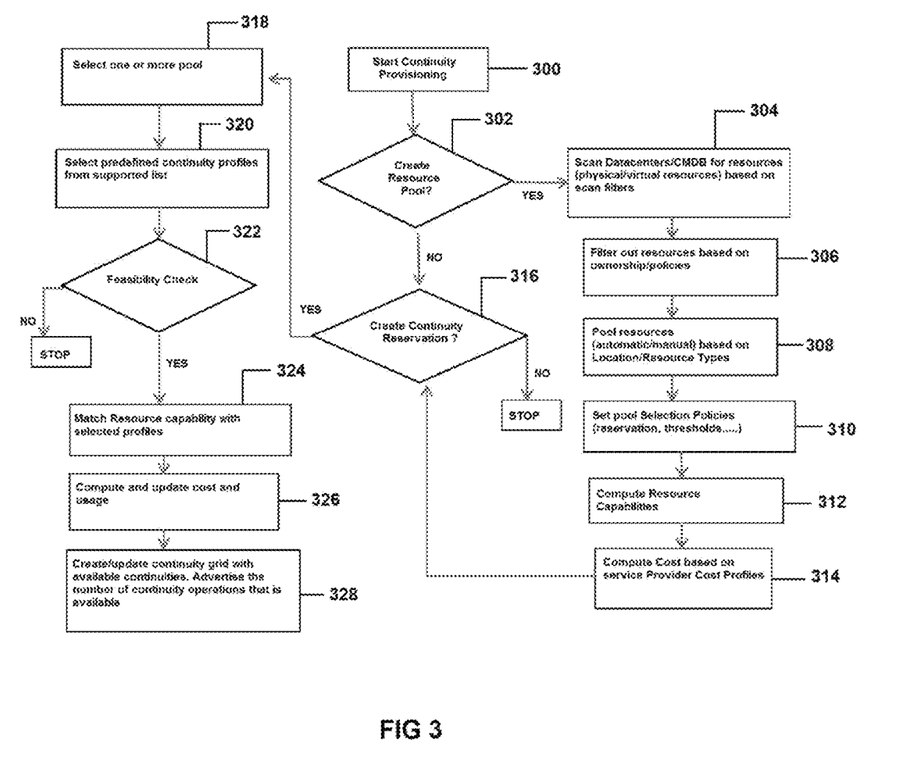
FIG. 3 is a flow chart illustrating the steps involved in creation of continuities according to the present invention.

FIG. 3 is a flow chart illustrating the steps involved in creation of continuities where administrators or Service providers want to reserve some resources which may be used for providing continuities.

At step 300 and 302, the continuity provisioning is started by creating resource pools. Thereafter, continuities are created using these resource pools. The continuities are created for pre-defined Continuity profiles.

At step 304, resources to be reserved are identified by scanning datacenter or CMDB (Configuration and Management database). Scope of scanning is given by using Scan Filters so that system 10 does not have to scan entire datacenter.

At step 306, from the list of resources system 10 gets certain resources which can be filtered out based on policies defined by administrators/service providers.

At step 308, the pooling of resource is done based on parameters such as, being not limited to, resource type and location. For e.g. separate pools may be created for high speed and low speed memory resources.

At step 310, once the resource pool is created, resource pool selection policies are set. At step 312 and 314, costs and capabilities are computed for each resource pool. Once resource pools are created, continuities are created using the said resource pool. Continuities are created for pre-defined continuity profiles. For e.g. administrator/service providers may want to use resources for protecting oracle database, then continuity are created such that oracle DB can be protected.

At step 316 and 318, one or more resource pools are selected/used to create continuity reservations. At step 320, as continuities are created for pre-defined user profile, the predefined continuity profiles are selected. At step 322 and 324, a feasibility check is conducted to match the capabilities of the selected resource pool with the predefined continuity profiles. In case the capabilities of the selected resource pool matches with the predefined continuity profiles, the resources are taken for providing continuity. At step 326 and 328, system 10 is prompted to calculate and update the cost and usage of resources, the number of Continuity Operations that are available because of new resources. Continuity Grids encapsulating these resource pools now updates the available continuity operations with additional Continuity operations. The said module also estimates the cost of providing continuity based on resource cost map. The said continuities are also advertised so that tenant/service providers looking for continuity can find it.

Figure 4:
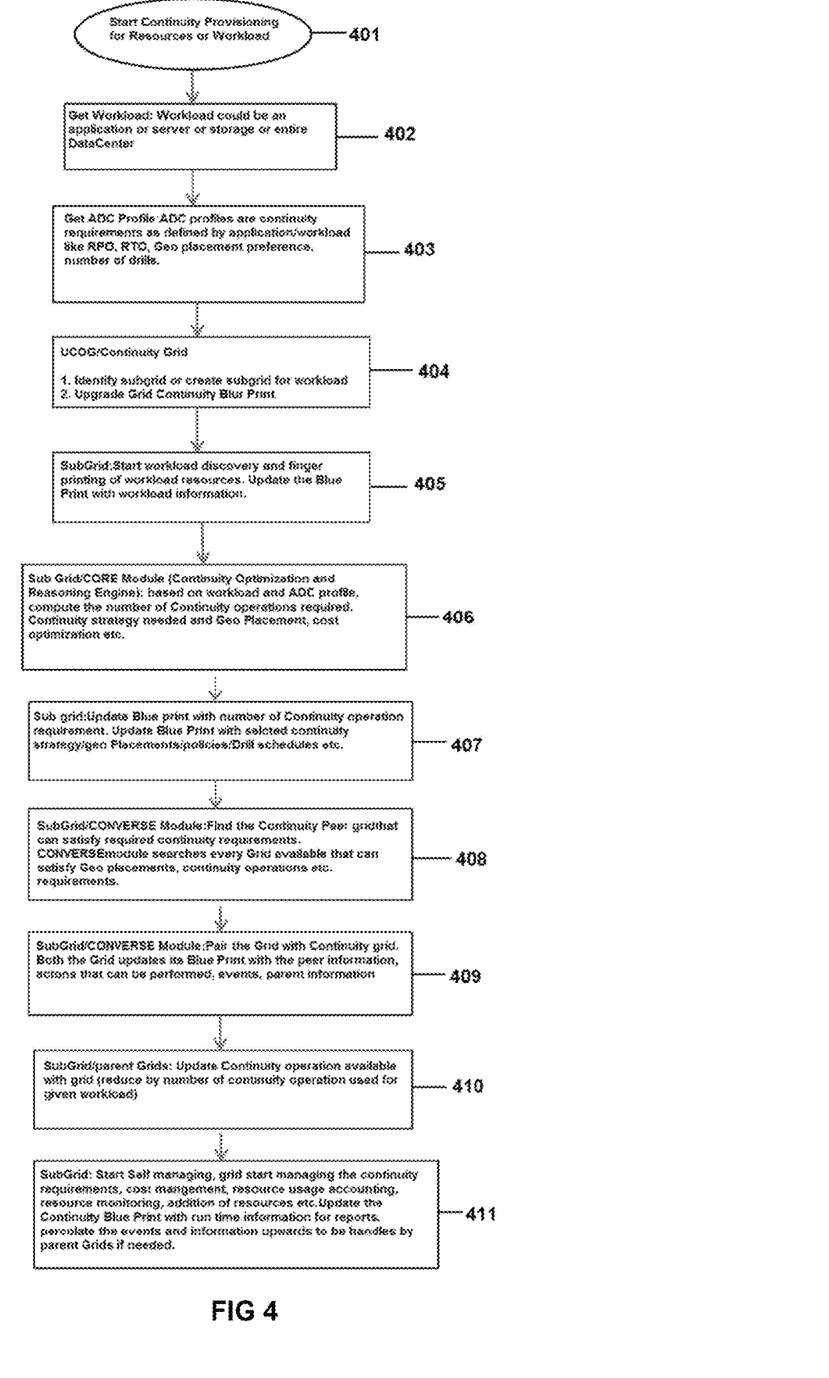
FIG. 4 is a flow chart illustrating a method describing the system of the present invention providing continuity to an application or workload.

FIG. 4 is a flow chart illustrating a method describing the system 10 of the present invention providing continuity to an application or workload.

At step 401 and 402, the system 10 is prompted to start the continuity provisioning for resources or workloads and gets the resources or workloads such as, being not limited to, an application or server or storage or entire data center.

At step 403, the system 10 is prompted to fetch the ADC profile of the said resources or workload. ADC profiles are continuity requirements as defined by application/workload like RPO, RTO, geo placements, number of drills etc.

At step 404, the UCOG is prompted to identify the sub-grids in the existing sub-grids or is prompted to create a new sub-grid for the said resources or workloads. The blue print of the UCOG is updated by the system.

At step 405, the existing or created sub-grids at step 404 are prompted to start work load discovery and fingerprinting of the workload/resources. The blue print of the sub-grid is updated with the workload information.

At step 406, based on the workload and ADC profile, the CORE module 140 of the system 10 is prompted to compute, being not limited to, the number of continuity operations required, continuity strategy needed and Geo Placements. It may further include, being not limited to, cost optimizations.

At step 407, the Continuity Blue Print of the said sub-grids is updated with, being not limited to, continuity strategy, continuity operations requirements, geo placements, policies, drill schedules etc. The Blue Print Continuity Meters are also updated based on continuity requirements from the ADC profile.

At step 408, the said sub-grids are prompted to discover the Continuity Peer Grid that can satisfy the said sub-grid continuity requirements. Continuity Universe (CONVERSE) Module 160 is prompted to search every Continuity Grid available that can satisfy Geo placements, continuity operations, continuity meters etc. requirements.

At step 409, Continuity Universe (CONVERSE) Module pairs the sub grid with its identified Continuity Peer Grid.

Both the Continuity Peer Grids is prompted to update their Continuity Blue Prints with the Continuity Peer information, actions that can be performed, events, parent information etc.

At step 410 and 411, the said sub-grids start managing the continuity requirements, cost management, resource accounting, resource monitoring, addition of resources etc. The Continuity Blueprints of the sub-grids are updated with, being not limited to, runtime information for reports and percolating the information upwards that can be handled by the parent grids.

Various types of Continuity Grids having different roles and functions may exist in a Continuity Grid structure. Some of the Continuity Grids commonly used in the Grid Structures are as follows:

Universal grid: A universal grid can orchestrate across clouds, datacenters and regions which means that the universal grid subsumes all grids in the location and is always present. In other words, any service teleportation at a topmost grid will end up at the universal grid which will exist as a limitless cloud of member grids. Typically, the universal grid is the monitor for all the other grids Continuity Grid Access Protocol Grid: Continuity Grid Access Protocol (CGAP) Grid is a virtual grid that has member grids that can be published to other grids for accounting, Disaster Recovery Intelligence [DRI] and other purposes. It can be considered as a summary Grid that can either help to look up or compute decision trees. Through the CGAP grid, it is possible to access continuity operations, grid capabilities, configurations, continuity blue prints, available resources, resource costs, bandwidth reservations, etc. Every grid has access to CGAP functionality using its teleported services. If any grid wants sectional or segmented views of the CGAP grid, the said grid can request for the view and the view will be provided with a viewport identifier that will accelerate requests. CGAP grid can be used to obtain a summarized view of the grid and if required drill down can be carried out with subsequent requests to sub grids below. CGAP can be considered as a hierarchical information grid supporting a common set of operations to retrieve it. A lookup or reference subset of all grid services will be implemented by the CGAP grid.

Blueprint grid: Blueprint Grid is a data driven Grid that has all the Blue prints for continuity and embedded within with each sub grid has its own blueprint. Blueprint grid can be queried and searched to find blueprints based on continuity solution indices. The solution index is usually discovered as part of the continuity grid schema Acquisition process (CGSAP)

Timeless Grids: Timeless Grids are regular grids except that they manage to be frozen. The continuity meter in the said Grids remain constant. The said Grid can be used like a regular grid but it will not be part of any continuity activity. However, such grids can be promoted at any time and can become timed grids. However, there can only be one timed grid instance of a grid and that is the primary grid. The primary grid at that time is cloned and frozen and then the access to that grid will be automatically setup.

Broker Grids: Broker Grids are virtual grids that can broker amongst several grids behind it (not inside it). Broker Grids can be considered as a grid router which shows and answers all questions aimed at grids behind (summarily linked). For example: a datacenter can have a single broker grid for oracle split amongst all of its manageable grids. The oracle broker grid can show advanced summarized functionality that can be allocated one at a time and this allows the service provider to divide the entire datacenter into functionally continuous tiers. This also allows seamless transition and of continuity maintenance across more than one cloud provider.

From the foregoing, various types of grids can exist in Continuity Grid Structure of the present invention. However, some properties of Continuity Grids that apply to each and every Grid are as follows:

Every Grid is independently monitorable irrespective of its size or location which means that all grids in the grid universe can be independently drilled down.

State of a Grid is the accumulated state of all Grid elements which means that it provides summarized monitoring capabilities.

Each Grid has a default grid when it is created.

Resources are part of a Grid or part of its default grid and can never be without a grid parent giving them the intelligence.

Grids have continuity peers that can be separated by geography, network, cloud, virtual machine, storage, etc.

Grids are elastic and can be resized (shrunk/grown) at any time.

Every Grid can account for all the actions on it, actions by it and actions for it.

Each Grid can communicate to its continuity peer grids, member grids and parent grids.

Any operation performed on a Grid will affect all members of the grid.

Every Grid can teleport itself to become part of any other Grid at any time.

Each Grid is part of the grid namespace which identifies its exact position within the grid universe.

Each Grid can have more than one continuity peer.

A Grid can have multiple states to indicate its readiness for operations.

Every Grid state is always time stamped so that its state is only valid at a particular time.

Every Grid records its actions, events, reports and states in a mineable manner.

Every Grid supports actions on it.

At the base level, each Grid can represent one or more cloud resources.

A resource can be storage, server, network, application, database, etc.

Resources in a Grid can have priorities that allow them to be preferentially treated for all actions on the Grid Grids can be located by using the namespace router that is able to take a grid namespace address and forward it to the router in the Grid closest to it.

Grid addresses are octet based and are universally accessible.

Every grid will have embedded active signature instances, workflows, policies, actions, reports, etc. that can be invoked by either its continuity peer or its parent.

Each parent grid can become a continuity peer with another parent grid if all elements of the two grids are themselves continuity peers with each other Members of a grid can have continuity peers with other grids that may not be members of a single grid and may even be geographically separated A grid can be virtual or real. The difference is that a virtual grid cannot perform certain actions performed by the real Grid. If a Grid is virtual, everything inside the grid is virtual. Real grids can also have virtual sub-grids inside them. In the case of a virtual grid, the default sub-grid will be virtual too A grid can have real or virtual members or a mix of both All grids are self-orchestrating and their parents can orchestrate across grids All grids available in the Grid Structures of the present invention are highly intelligent which allows them to reason and decide the following:

Take many continuity strategies and decide which fits the grid or resource best within the said grid.

Dynamically calculate the resource type required to achieve cost based SLAs at the time of recovery.

Adjustably use heterogeneous replication strategies to arrive at SLA goals.

Dynamically enable service providers to decide where to locate resources so that rolling accumulated continuity failures can be avoided.

Estimate when workloads need to be moved so that continuity capabilities do not suffer at a particular location.

Arrive at the lowest cost solution for any selected continuity based on datacenter or cloud resources.

Suggest resource tiering to meet continuity goals automatically.

Dynamically design the continuity blueprint for the grid.

The Grids being self-aware ensure that continuity is built up by multiple self-aware continuous sub-grids. This means that no centralized management is required to provide continuity on a massive scale. The Grids create a truly single point solution to offer uniform continuity services across a wide array of entities including service providers capabilities, cloud technologies, storage technologies, applications, databases, customer datacenters, point applications, etc. The present invention offers the ability for a service provider to think of his entire datacenters as one single Grid and maintain continuity across the entire Grid automatically. The present invention allows incredible elasticity as far as adding/subtracting workloads. The present invention offers continuity to resources irrespective of their scale (application, datacenter, branch office, company, group of companies) in a completely transparent and homogenous manner. The present invention allows infinite scaling using cloud resources on demand. The present invention also provides future blueprint to enable storage centers, application farms, network grids and virtual business centers to be managed with the click of a button. The grids are self-healing and can repair themselves at any time provided they have access to information that allows them to do so. Since accounting is a core function of the grid even for it to make its own decisions, it enables providers to save cost and offer better services while customers will realize the economics of scale.

Another fundamental aspect of the architecture of the present invention is that virtual or simulated nature of a grid is built into every part and this means that users can simulate portions of their infrastructure, run tests and observe behavior before deploying and in general have a ready system to profile, pattern, architect, deploy and verify their continuity plans irrespective of the size/scale of their infrastructure or capabilities.

While the present invention has been shown and described with reference to exemplary embodiments, it will be understood by those skilled in the art that various changes in form and detail may be made therein without departing from or offending the spirit and scope of the invention as defined by the appended claims.

Although this invention has been disclosed in the context of certain preferred embodiments and examples, it will be understood by those skilled in the art that the present invention can be constructed and utilized in a plethora of different ways. It should be understood that many changes, modifications, variations and other uses and applications will become apparent to those persons skilled in this particular area of technology and to others after having been exposed to the present specification and accompanying drawings. Any and all such change, modifications, variations, and other uses and applications which do not depart from the spirit and scope of the present invention are therefore covered by and embraced within the present invention and the patent claims set forth herein-below.

REFERENCE NUMERAL LIST

10 System
20 End User/Service Provider Portal
30 Service Provider Integration Module
40 Cloud Continuity Module
50 Continuity Grid
60 Continuity Sub Grid
70 Tether
80 Continuity Blue Prints
90 Datacenter Acquisition Module
100a ADC API
100b ADC Controller
110 Physical/Virtual/Cloud Resource Management Module
120 Fully Automated Continuity Tiering (FACT) Module
130 Elastic Continuity Grid (ECG) Module
140 Continuity Optimization and Reasoning Module (CORE) Module
150 Application Continuity Tethering Service (ACTS) Module
160 Continuity Universe (CONVERSE) peer Linking Module
170 Cost and Accounting Module
180 Blue Print Management Module
190 Grid Execution Service Module
200 Communication and Access layer
210 Orchestration Module
220 End User Interface
230 Service Provider interface
240 Information Exchange/API Layer

We claim:
1. A system comprising:
a local blueprint for supporting continuity for all local resources of a particular sub Grid;
a first continuity grid having a first collection of hardware computer resources of multiple end users or service providers logically connected to a first at least one cloud infrastructure;
a second continuity grid having a second collection of hardware computer resources connected to a second at least one cloud infrastructure; and
a cloud continuity subsystem connected to both said first at least one cloud infrastructure and to said second at least one cloud infrastructure, said cloud continuity subsystem including one or more hardware computer resources for executing instructions for implementing software defined continuity (SDC) and application defined continuity (ADC) according to a plurality of continuity requirements for achieving Business Continuity and Application Continuity comprising one or more resources of multiple end users or service providers logically connected to one or more cloud infrastructures;

wherein at least part of said first continuity grid is paired by the cloud continuity subsystem with the second continuity grid located in the same or different cloud infrastructures to satisfy the continuity requirements, and wherein said local blueprint defines continuity operations used to maintain continuity metrics used to preserve continuity of local resources within said particular sub Grid, wherein, for each particular sub Grid comprised in a portion of sub Grids in the first Continuity Grid, there is provided by the cloud continuity subsystem a corresponding continuity peer sub Grid in the second Continuity Grid for providing continuity for the particular sub Grid in the first Continuity Grid by action of a respective continuity tether that is configured to provide a data pipeline to control and transform data flowing between the particular sub Grid and the peer sub Grid for providing continuity for the particular sub Grid, and wherein at least some number of said plurality of sub Grids in said first Continuity Grid are each a parent sub Grid hierarchically arranged to be comprised of one or more child sub Grids each also including a local blueprint for providing continuity with a corresponding child peer sub Grid provided in said second Continuity Grid.

2. The system as claimed in claim 1, wherein Application Defined Continuity define application continuity independent of the underlying cloud infrastructure using ADC profile created by ADC API.

3. The system as claimed in claim 2, wherein ADC profile for a workload is translated into a continuity template by ADC Controller such that Software Defined Continuity (SDC) can provide continuity.

4. The system as claimed in claim 1, wherein Continuity grids contain a set of resources and are linked with continuity peers that may or may not be in the same cloud, datacenter, geography or accessible location.

5. The system as claimed in claim 4, wherein every resource has a continuity strategy that is applied to the said resource and applying the strategy results in one or more Continuity Peers in the entire system.

6. The system as claimed in claim 1, wherein every Continuity Grid has a tether that links all data movement from one continuity grid to its Continuity Peers and wherein all Continuity Grids including sub-grids can teleport their tether to the parent continuity grids.

7. The system as claimed in claim 1, wherein continuity grids start out being a dark grid with a wireframe and comprise basic services required for functioning of grid and default or empty configuration values for Continuity Blue Print.

8. The system as claimed in claim 7, wherein continuity on any Continuity Grids is enabled using Continuity Blue Prints that are updated due to entity/resource fingerprinting during the self-aware discovery process where a UCOG discovers its members or when commands supplying specific information are released into the UCOG from external sources.

9. The system as claimed in claim 8 wherein Continuity Grids actively fingerprint everything under its control and fill out the blueprint with practical values from the installations it manages and a given continuity/ADC profile and ends up with its own Continuity Blue Print.

10. The system as claimed in claim 4, wherein the Continuity Grids scales elastically whenever resources are added to it and maintains SLAs within the ambit of the enclosing infrastructure.

11. The system as claimed in claim 1, wherein Continuity Grids map entire system rendering a single Continuity Blue Print for the entire system.

12. The system as claimed in claim 7, wherein Continuity Blue Prints have Continuity Operations filled out and the values of Continuity Operations are automatically adjusted to reflect the altered continuity capabilities of the Continuity Grids when resources are added or removed to/from the Continuity Grid.

13. The system as claimed in claim 1, wherein Continuity Grids are self-tuning and can change continuity strategies to adjust for load changes, emergency situations, exception handling based on datacenter policies.

14. The system as claimed in claim 1, wherein each Continuity Grid comprises or has an access to Data center Acquisition Module, Virtual and Physical Resource Management Module, Fully Automated continuity Tiering (FACT) Module, Elastic Continuity Grid (ECG) Module, Continuity Optimization and Reasoning Engine (CORE) Module, Application Continuity Tethering Services (ACTS) Module, Continuity Universe (CONVERSE) Module, Cost and Accounting Module, Blue Print Management Module, Grid Execution Services Module, ADC API, ADC Controller, Information Exchange/API Layer, Communication and Access Layer, Orchestration Module, End User Interface and Service Provider Interface.

15. The system as claimed in claim 1, wherein every Continuity Grid relies on a continuity meter that is a combination of a fixed values and live measurements.

16. The system as claimed in claim 15, wherein the Continuity meter comprises Service Level Agreement (SLA) metrics dial, continuity phase shift dial, geographical proximity dial and the desired cost dial.

17. The system as claimed in claim 1, wherein continuity handled by each Continuity Grid is defined as phase shift, geography and operational levels handled by all the continuity grids.

18. The system as claimed in claim 1, wherein each Continuity Grid is self-aware, self-managing and can be independently monitored and drilled down to the desired level.

19. The system as claimed in claim 1, wherein the Continuity Grids can be promoted from lowly continuous to highly continuous and vice versa at any time.

20. A method using a cloud continuity subsystem including a computer system and a local blueprint for supporting continuity for all local resources of a particular sub Grid to provide continuity to a workload or resource of a first continuity grid having a first collection of computer resources of massively scalable entities connected to a cloud infrastructure, said method using software defined continuity (SDC) and application defined continuity (ADC) for achieving business continuity and application continuity for the massively scalable entities, wherein a local blueprint defines continuity operations used to maintain continuity metrics used to preserve continuity of local resources within said particular sub Grid, and wherein, for each particular sub Grid comprised in a portion of sub Grids in the first Continuity Grid, there is provided by the cloud continuity subsystem a corresponding continuity peer sub Grid in a second Continuity Grid for providing continuity for the particular sub Grid in the first Continuity Grid by action of a respective continuity tether that is configured to provide a data pipeline to control and transform data flowing between the particular sub Grid and the peer sub Grid for providing continuity for the particular sub Grid, and wherein at least some number of said plurality of sub Grids in said first Continuity Grid are each a parent sub Grid hierarchically arranged to be comprised of one or more child sub Grids each also including a computer system and a local blueprint for providing continuity with a corresponding child peer sub Grid provided in said second Continuity Grid, the method comprising the steps of:

a. the cloud continuity subsystem starting the continuity provisioning by end user or service provider or automatically or as and when new workloads are added to the first continuity grid;
b. the cloud continuity subsystem fetching the resources or workloads;
c. the cloud continuity subsystem fetching an ADC profile of the said resources or workload as input by end customer or service provider;
d. the cloud continuity subsystem identifying sub grids in existing parent grids in the first continuity grid by universal continuity grids or creation of new grids/sub-grids by the universal continuity grids;
e. the cloud continuity subsystem updating a blueprint of the parent grids with the knowledge of the sub-grids;
f. the cloud continuity subsystem starting resource discovery by the sub-grids identified in step d;
g. the cloud continuity subsystem starting fingerprinting of the discovered resources identified in step f;
h. the cloud continuity subsystem updating blueprints of sub-grids with the resource information obtained at step f and step g;
i. the cloud continuity subsystem computing the number of continuity operations required, continuity strategy needed, Geo Placements, cost optimizations by sub grids based on resources/workload and ADC profile;
j. the cloud continuity subsystem updating the blueprints of sub-grids with the continuity operation information obtained at step 1;
k. the cloud continuity subsystem finding continuity peer grids in another cloud infrastructure that can satisfy continuity requirements of the sub grids;
l. the cloud continuity subsystem pairing the sub-grid and continuity peer grid obtained at step k;
m. the cloud continuity subsystem updating the blueprints with the peer information, actions that can be performed, events, and/or parent information;
n. the cloud continuity subsystem adjusting the number of continuity operations available with sub grids and parent grids with number of continuity operations needed to provide continuity for given resource/workload; and
o. the cloud continuity subsystem managing continuity, cost management, Resource Accounting, Resource Monitoring and percolating the information upwards to parent grids and updating the blueprints with changes.

21. A system for achieving business continuity, comprising:

a first Continuity Grid located in a first cloud system, said first Continuity Grid comprising a plurality of first Continuity sub Grids;

a second Continuity Grid located in a second cloud system, said second Continuity Grid comprising a plurality of second Continuity sub Grids; and a cloud continuity subsystem comprising a continuity computer system connected to a plurality of cloud systems including said first cloud system and said second cloud system, said continuity computer system being configured to execute a software module comprising instructions for providing respective continuity peer sub Grids from at least some the second Continuity sub Grids in the second Continuity Grid for a portion of the plurality of first Continuity sub Grids in the first Continuity Grid;

wherein each particular first Continuity sub Grid of the portion of the plurality of first Continuity sub Grids in the first Continuity Grid has local resources including:

a computer system for executing applications, said computer system including one or more servers, storage devices, and networks, and a local blueprint for supporting continuity for all local resources of the particular first Continuity sub Grid, wherein the local blueprint defines continuity operations used to maintain continuity metrics used to preserve continuity of the local resources within said particular first Continuity sub Grid;

wherein, for each particular first Continuity sub Grid comprised in said portion of the plurality of first Continuity sub Grids in the first Continuity Grid, there is provided by the cloud continuity subsystem a corresponding continuity peer sub Grid in the second Continuity Grid for providing continuity for the particular first Continuity sub Grid in the first Continuity Grid by action of a respective continuity tether that is configured to provide a data pipeline to control and transform data flowing between the particular first Continuity sub Grid and the peer sub Grid for providing continuity for the particular first Continuity sub Grid, and wherein at least some number of said plurality of first Continuity sub Grids in said first Continuity Grid are each a parent first Continuity sub Grid hierarchically arranged to be comprised of one or more child first Continuity sub Grids each also including a computer system and a local blueprint for providing continuity with a corresponding child peer sub Grid provided in said second Continuity Grid.

* * * * *